THERMALLY SENSITIVE PICKUP TUBE

Filed July 24, 1958 3 Sheets-Sheet 1

INVENTOR:
HANS W. HEIL
BY Richard V. Lang
HIS ATTORNEY.

Jan. 10, 1961 H. W. HEIL 2,967,961

THERMALLY SENSITIVE PICKUP TUBE

Filed July 24, 1958 3 Sheets-Sheet 2

INVENTOR:
HANS HEIL,
BY Richard V. Lang
HIS ATTORNEY.

Jan. 10, 1961 H. W. HEIL 2,967,961

THERMALLY SENSITIVE PICKUP TUBE

Filed July 24, 1958 3 Sheets-Sheet 3

INVENTOR:
HANS HEIL,

BY Richard V. Lang
HIS ATTORNEY.

United States Patent Office 2,967,961

Patented Jan. 10, 1961

2,967,961

THERMALLY SENSITIVE PICKUP TUBE

Hans W. Heil, Syracuse, N.Y., assignor to General Electric Company, a corporation of New York Filed July 24, 1958, Ser. No. 750,813

22 Claims. (Cl. 313—65)

The present invention relates to thermally sensitive pickup devices and in particular to a camera tube suitable for converting images of objects illuminated by infra-red or heat radiation into an electrical signal.

The pickup or camera tube herein disclosed is of somewhat similar application to television camera tubes in that it is adapted to receive an image input from which it produces an electrical signal output containing the image information. The mode of operation of applicant's camera tube is also analogous to known camera tubes. Like other known camera tubes, applicant's pickup tube has an image forming member or target upon which the image is focused in a simple area type presentation. The target is of a radiation sensitive material converting the image into an area type pattern of a magnetic nature. A reading electron beam is then employed which recurrently scans the magnetic pattern on the image forming member to provide a continuous electrical version of the scene. The mode of scansion is in successive lines to form complete frames, and then successive frames. The reading electron beam is deflected as it approaches the target by the pattern thereon in an amount depending upon the image brightness. The deflection is then used directly or indirectly to produce a modulation forming the output signal.

The pickup tube herein disclosed differs in application from known camera tubes in that it is sensitive to radiations lying in the infra-red or heat portion of the electromagnetic radiation spectrum. At the present time, no image forming camera tube is known which is suitable for forming an image at the far infra-red portion of the spectrum. This arises from the fact that the targets of known camera tubes depend upon the energy in the incident radiation to detach electrical charges from the target in creating a charge mosaic version of the image. The reading electron beam on approaching the target is then modulated in path near the surface of the target dependent upon the local condition of charge. In one common arrangement, the visually created charge mosaic determines the percentage of the beam which land or not land at any portion of the target. At infra-red wavelengths, the energy in the incident radiation is insufficient to strike off charges on the target for creation of a charge mosaic of the image. Applicant for this reason has devised a new mode for establishing an intermediate patern of the image.

Accordingly, it is an object of the present invention to provide a new and novel camera tube capable of operating in the infrared spectrum.

It is another object of the present invention to provide a new and novel camera tube capable of operating in the infra-red spectrum and having an appreciable gray scale.

It is still another object of the present invention to provide a new and novel pickup tube which is capable of providing a continuous conversion of moving or changing scenes illuminated in infra-red radiation into a continuous electrical signal.

These and other objects of the present invention are achieved by use in applicant's novel camera tube of a thin target having thereon a thermally sensitive material capable of localized regions of super-conductivity. The image is focused upon a heat radiation absorbing layer applied to one surface of the target so as to bring about continuous heating of localized regions of the target material. The target is then continuously cooled at a substantially constant rate to a temperature sufficiently low such that in the absence of an image substantially all of said target is held super-conductive. The presence of an image on the target then causes localized regions to assume different temperatures in or near the super-conducting temperature region. Means are then provided for transforming the temperature type display into a magnetic field picture. In one illustrative embodiment of the invention, the magnetic field image is provided by establishing a magnetic field in a plane perpendicular to the target. Those portions of the target which are momentarily super-conducting tend to prevent the passage of a magnetic field through the target and thus cause tiny regions of reduced magnetic fields at the target surface. The target is then scanned by an electron beam preferably approaching the target with a glancing incidence. Minute inhomogeneities in the field arising from super-conducting regions bring about an alteration in the trajectory of individual electrons and a gross non-specular reflection of the reading beam. Means are then provided for separating those portions of the beam which have encountered a non-specular reflection and those portions are used in deriving an electrical signal voltage containing the image information.

In accordance with a further embodiment of the invention having an improved gray scale, the sensitive material of the target takes the form of individual ringlets into which an amount of magnetic flux is recurrently "frozen" prior to the reading of each line or frame. The "freezing" in of the flux is accomplished by a momentary elevation and depression of the magnetic field. It produces small fields whose magnitudes are dependent upon the temperatures of the individual ringlets.

The features of the invention which are believed to be novel are set forth with particularity in the appended claims. The invention itself, however, both as to its organization and method of operation, together with further objects and advantages thereof may best be understood by reference to the following description when taken in connection with the drawings, wherein:

Figure 1 illustrates applicant's novel camera or pickup tube, in sectional view, in association with its operational equipment, represented in conventionalized block form;

Figure 2*a* is a section of applicant's novel pickup tube illustrating the placement of the principal electrodes of the camera tube and the beam trajectory, Figures 2*b* and 2*c* being respectively side and front elevations of the same electron trajectory illustrated in Figure 2*a*;

Figure 3 is a detailed drawing illustrating the construction of one form of target in applicant's novel pickup tube;

Figures 4*a* and 4*b* are orthogonally related views illustrating the manner in which electron trajectories are modified in the presence of the target;

Prior now to a detailed consideration of the camera tube of applicant's invention it may be observed that the invention herein disclosed lies in a highly advanced technical art. By virtue of this condition, the teaching herein contained for the practice of the invention is based upon much that has preceded. As a further guide to the public in the practice of the present invention, applicant would mention several sources containing technology of recent origin and of particular pertinence to the execution of portions of the present invention. In the execution, use, and adjustment of the angled beam method of reading target information, reference is made to the RCA Review of September 1949, pages 366 to 386, containing an article on "The Image Isocon" by Paul K. Weimer. In the scanning of small magnetic fields by electron beams reference is made to an article entitled "Electron Mirror Microscopy of Magnetic Domains" by Ludwig Mayer appearing in the Journal of Applied Physics, September 1957, pages 975 to 983.

Figure 1:
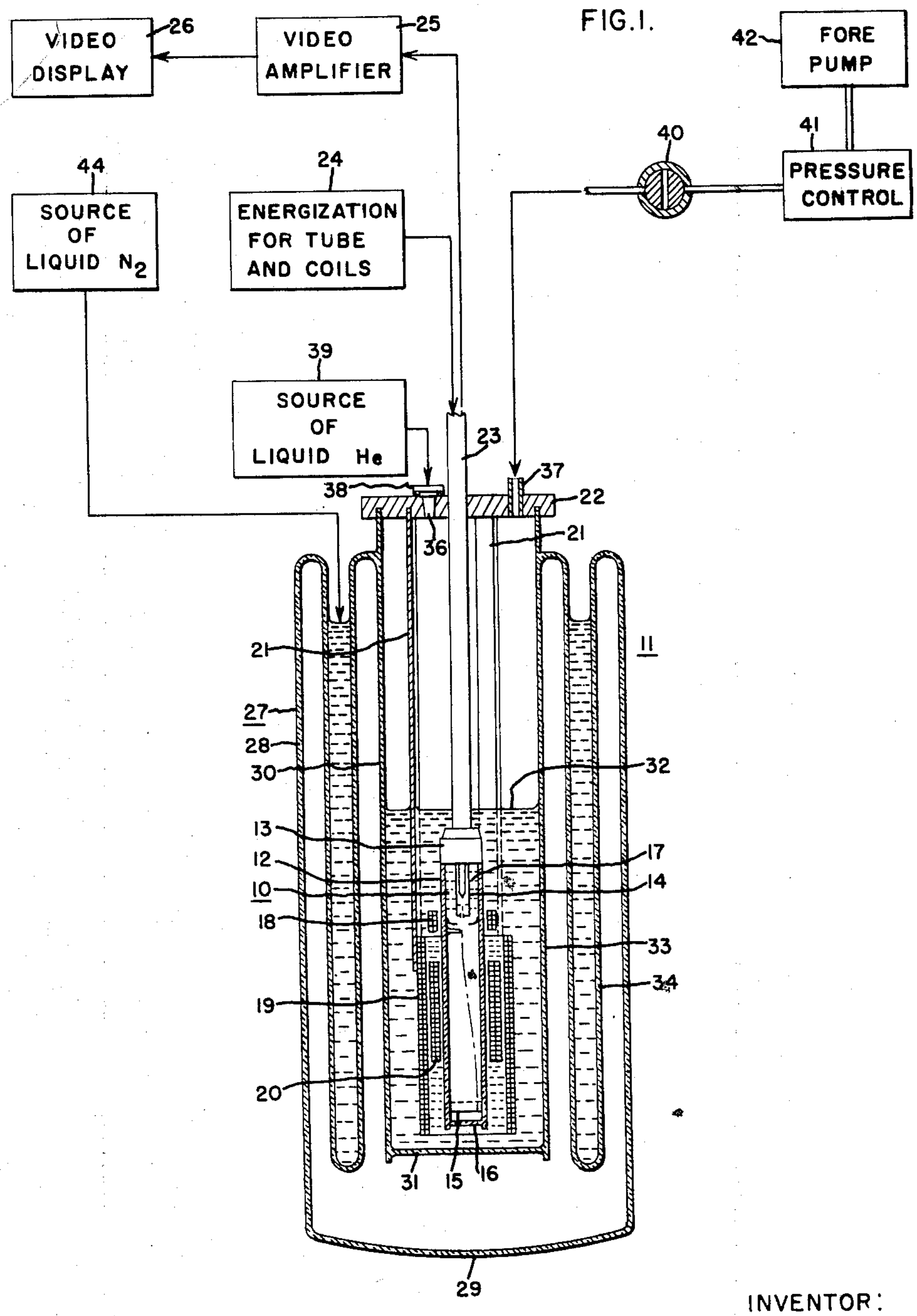

Referring now to Figure 1 there is shown applicant's novel infra-red sensitive camera tube 10 in association with the requisite auxiliary operating equipment.

The camera tube 10 is shown in place in the camera assembly 11, which provides the necessary operating environment for the camera tube. The auxiliary operating equipment is shown in block diagram form.

The camera tube 10 is illustrated in Figure 1 in a simplified fashion in order to simplify consideration of the operating conditions and equipment necessary for operating the tube. In general, it may be seen that the camera tube 10 is provided with an envelope 12 of generally cylindrical outline having at the upper extremity, as viewed in Figure 1, a base 13 provided with pins, not shown, for effecting external electrical connection to electrodes within the camera tube. Also, at the upper end of the tube, as viewed in Figure 1, there is provided an electron gun 14 arranged to direct an electron beam generally along the axis of the tube in a direction toward the bottom thereof. At the bottom of the camera tube a target 15 is provided in proximity to the window 16 of the tube. The window 16 is of optical quality and transparent to infra-red radiation. Further details of the physical and electrical properties of the elements 15 and 16 will be indicated below.

The tube is further provided with an anode and electron multiplier assembly 17 encircling the electron gun 14 and adapted to collect the beam in selective fashion as it returns from the target.

Alignment and focusing of the electron beam is provided by the coils 18 and 19, respectively, while deflection is provided by the coils 20, two pairs of which are provided for causing the beam to be swept over the face of the target 15. The foregoing coils 18, 19 and 20 are arranged around the camera tube 10 and suspended as a unit by straps 21 from the cover plate 22 of the camera assembly 11.

The electrodes of the camera tube 10 and the external coils 18, 19 and 20 associated with it are electrically connected by means of the cable 23, shown fastened to the base 13 of the camera tube, to appropriate energization means 24 and utilization means 25 and 26. The energization means 24 is of conventional design, comprising a source of filamentary voltages for the electron gun, a source of voltages for the electron beam forming electrodes and beam controlling electrodes, a succession of direct voltages for the electron multiplier and a direct current source for the focusing and alignment coils. The deflection coils are provided with periodic currents of a conventional shape and frequency to provide a regular scansion of the beam over the target 15. The utilization means comprises a video amplifier 25 and a video display device 26, such as a cathode ray tube.

The target 15 of the camera tube is adapted to be operated at low temperatures. These temperatures must be sufficiently low to permit the sensitive material of the target to become super-conductive. Operation of the camera tube at such a low temperature is preferably achieved by means of liquid helium and nitrogen cooling and proper thermal insulation.

The equipment providing the foregoing low temperature cooling and the insulation are best seen in Figure 1. The camera 10 is shown in place in a large multi-walled vacuum flask 27. The flask 27 is provided with an upper closure member or cover plate referred to earlier and bearing a reference numeral 22, an outer cylindrical wall 28, and an outer bottom closure 29. The flask 27 has an inner chamber formed by an inner cylindrical wall 30 and an inner bottom closure 31. The camera tube 10 and deflection equipment are placed within the inner chamber. The space between the inner chamber and the outer walls of the flask is evacuated to a low pressure of nitrogen. In order to minimize the absorption of external radiation, the surfaces are made reflective. The inner chamber in the present apparatus is normally partially filled with liquid helium, the usual level of helium being such as to completely immerse the camera tube 10 and its deflection apparatus. Liquid helium is shown at 32 filled to a typical level.

Cooling of the inner chamber of the flask 27 to temperatures below the outside environment is facilitated by reentrant lateral walls 33 and 34 which extend for substantially the total length of the inner chamber. The walls 33 and 34 define an open circular trough surrounding the inner chamber and are adapted to contain low temperature fluids such as liquid nitrogen. The bottom closure 29 of the flask 27 and the bottom closure 31 of the inner chamber are formed of infra-red transparent materials of spherical or optical quality surfaces.

The inner chamber is filled with liquid helium by means of a pair of openings 36 and 37 in the flask closure plate 22. The opening 36 may be a simple hole through the cover plate 22 which is provided with a gasketted cap 38 adapted to provide a hermetic seal to the chamber when the pressure within the chamber is reduced below atmospheric pressure. The source of liquid helium is shown at 39. It is usually only coupled to the opening 36 during liquid helium transfer. The opening 37 is provided with an extending bushing to permit connection of the inner chamber through a valve 40 to a pressure control element 41 leading to a fore-pump 42. The foregoing elements permit reduction of the pressure in the inner chamber below atmospheric pressure, thus depressing the boiling temperature of the helium contained within the inner chamber of the flask, and maintaining it at a preset value by means of the pressure control element 41.

In cooling the system down to operating temperature, some care is required to avoid undesired condensation or obstruction of the transfer ducts. One satisfactory method is to initially evacuate the inner chamber to a pressure of 1 or 2 millimeters of mercury of principally dry air or nitrogen content. The trough defined by the walls 33 and 34 is then filled from the source 44 of liquid nitrogen. Since the boiling off rate is quite rapid, the conduit transferring the liquid nitrogen may be kept in the trough. The liquid nitrogen then cools the inner chamber by convection and conduction of the nitrogen gas sealed in the interior of the flask at a pressure of the order of a millimeter of mercury. After the temperature of the inner assembly has fallen to near that of the nitrogen, helium gas may be valved into the inner chamber at atmospheric pressure. At this point the cover 38 may be removed, and the source of liquid helium coupled through a double walled tube to the inner chamber of the flask. The prior introduction of helium gas at atmospheric pressure prevents entry of air into the system during the introduction of liquid helium. After the chamber is substantially filled with liquid helium, the opening 36 is closed and the fore-pump 42 coupled to evacuate the inner chamber. As the inner chamber reaches temperature of the liquid helium, the nitrogen gas sealed in the flask is solidified, and the vacuum becomes essentially perfect, improving the insulation qualities of the flask. The continued pumping of the fore-pump 42 serves to reduce the boiling temperature of liquid helium to a temperature below the normal boiling point of helium.

Such reduced temperature may be desired because of the choice of superconductive material used in the target and (or) because the super fluid property of the liquid helium below the λ point is necessary to avoid bubbling within the optical path. It should be apparent that if neither factor requires operation at such low temperatures, such a pressure reduction may not be necessary, and the liquid helium system may be operated at atmospheric pressure. The foregoing apparatus thus provides a temperature controlled low temperature environment for the camera tube 10.

The rate at which cooling is effected between the surrounding liquid helium and the target 15 is pre-adjusted in the following manner. As mentioned earlier, the camera tube 10 is provided with a second end wall 16 arranged in close proximity to the target 15. Both the target 15 and the end wall 16 are hermetically sealed to the cylindrical walls of the camera tube to define a closed chamber at the lower end of the camera tube. The chamber defined by the elements 15 and 16 contains helium at reduced pressure, typically 0.0015 mm. of mercury.

The pressure of the helium gas in the chamber between the target 15 and wall 16 determines the rate of cooling of the target and thus the duration of retention of changing or moving image upon the camera target. The pressure, which is selected to be a small fraction of atmospheric pressure, is low enough to maintain the helium at all times at a gaseous state. The distance between the two members 15 and 16 is chosen to be comparable to or less than the mean free path of the helium atoms at the specified pressure. Reducing this distance to less than the mean free path minimizes lateral heat transfer by the agency of the gas molecules in the chamber and improves image resolution.

The foregoing camera assembly is best adapted for operation in the essentially vertical orientation indicated in Figure 1. The angle of operation, however, is not confined to a perfectly erect position, but may be inclined to the vertical. In applications in which the foregoing infra-red camera is used to search the sky or subjects assuming a position above the camera, some intermediate optical system is usually required. One such optical system may involve the use of a mirror placed below the camera tube assembly arranged to focus an object overhead upon the target of the camera tube. In the event that use at rather low angles of elevation are contemplated, a heliostatic type of optical system may be employed.

Figure 2A:
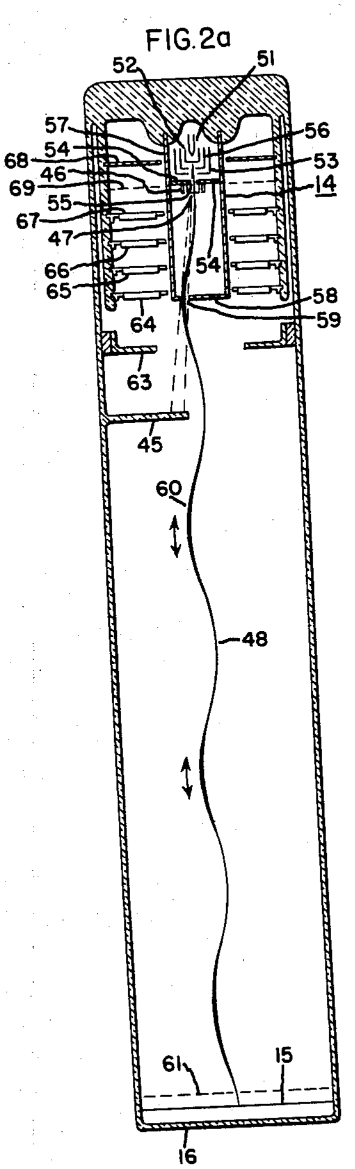
Figure 2B:
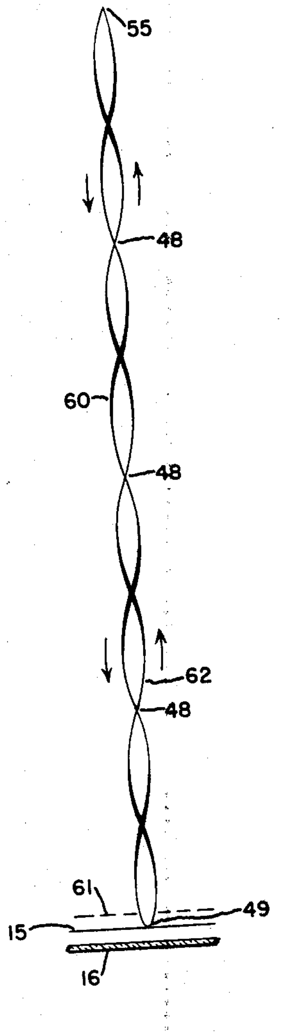
Figure 2C:
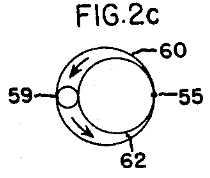

At this point, the construction and electrical operation of applicant's novel infra-red sensitive camera tube may be considered. The principal electrodes of the camera tube may best be seen in Figure 2*a* which illustrates the full electron trajectories and principal electrodes of the camera tube. Figure 2*b* illustrates in side elevation the full electron trajectories and Figure 2*c* represents a front elevation view of the electron trajectories.

Applicant's tube is provided with an electron gun of the type adapted to introduce a beam of electrons along a path making an angle to the normal operating axis of the tube defined by the direction of magnetic flux of the focusing coil, generally coincident with the geometrical axis of the tube envelope. The electron gun is shown generally at 14 and may be inclined an appropriate amount to the plane of the paper. It preferably employs a "hairpin" cathode 52 requiring minimal heating power. The electrons emitted by the cathode 52 are focused into a beam by means of the focusing and accelerating electrodes 53 and 54. The accelerating electrode 54 is provided with an aperture 55 central to the axis of the tube. The aperture is small, typically 0.002 inch to facilitate definition. The accelerating electrode 54 is given a positive potential of several hundred volts with respect to the cathode, typically 200 volts. The beam current is controlled by means of a control grid 56 immediately adjacent to the cathode, and normally assuming a negative potential, typically 30 volts negative with respect to the cathode.

Precise adjustment of the beam launching angle is achieved by means of two pairs of small electrodes 46 and 47, respectively, supported in insulated fashion upon the disk 54 in close proximity to the beam defining aperture 55. The voltage between pairs of these electrodes may be quite small, typically a few volts. If the initial beam direction is not achieved by tilting of the electron gun as mentioned above one may use there electrodes for achieving the total launching deflection. In this latter event somewhat larger inter-electrode voltages are required.

The construction and energization of the beam forming parts 51 through 56 is generally similar to that of conventional image orthicon type camera tubes departing therefrom principally in the measures directed toward launching the beam at an angle and in the use of several otherwise well known measures for reducing the amount of heat energy required to keep the cathode at operating temperature and for preventing heat radiation from reaching the target. In general, these measures consist in thermally isolating the cathode by using mechanical supports of low heat conductivity, and in surrounding the cathode by several reflective cylindrical shells which also support the control grid 56 and focusing and accelerating electrodes. The outermost cylinder 57 surrounding the cathode is that supporting the beam defining apertured plate 54. The cylinder 57 is sufficiently thick and thermally conductive to provide a good heat conduction path from the plate 54 to the base of the camera tube which in operation is immersed in liquid helium. This provision tends to keep the cylinder 57 and parts supported thereon at a low temperature.

The angular aperture of the beam is established by the plate member 58 having an aperture 59. The plate 58 is also supported upon the cylindrical support member 57, which support provides a good heat conduction path from the plate 58 to the base of the camera tube and thus permits normal operation of the plate 58 at a low temperature. The plate 58, for reasons to be developed in greater detail below, is spaced from the apertured plate 54 at approximately one half the focal length (inter-nodal distance) of the electron trajectory as determined by the axial magnetic field strength and beam velocity. The aperture 59 is placed off the axis of the tube in a position to permit passage of the bulk of the beam launched by the gun 14. The aperture 59 is of a diameter to subtend an angle of approximately 2° measured from the defining aperture 55. It may be desirable to enlarge the foregoing aperture or make it non-circular in the interests of facilitating collection of the return beam.

The foregoing elements 52 through 59 define an electron beam whose initial angle to the axis of the tube is typically 9° having an approximate total angular aperture of 2° and an energy of several hundred volts. The field created by the focusing and aligning coils 18 and 19 along the axis of the camera tube 10, causes the foregoing beam to travel along a helical path, the center of which helix, absent energization of the deflection coils 20, is parallel to the direction of the focusing flux. The spiral path of the undeflected electron beam is indicated at 60. Since the beam 60 is illustrated in a simple plan view in Figure 2*a*, the center trace of the beam appears to be sinusoidal in shape, and is drawn to the left of the axis of the tube and tangent thereto at the nodal (or focal) planes 48 of the beam. In the drawing of Figures 2*a* and 2*b* five nodal planes, including that at the defining aperture 55 and that at the target 15, are shown. At these nodal planes 48 the beam width is reduced to a minimum substantially equal to that of the cathode beam defining aperture 55. At the anti-nodal planes midway between the nodal planes, the beam is widest, having a width of approximately the same size as the separation aperture 59. The inclination of the forward beam at the nodal planes is best seen in Figure 2*b*, which is a side elevation view of the tube 10; assuming Figure 2*a* to be a plan view. The forward beam 60 is seen to leave cathode aperture 55 at the selected launching angle and to intersect each succeeding nodal plane 48, save for the last one in the region of the target 15, at the launching angle. Looking toward the cathode from the target end of the tube as illustrated in Figure 2*c*, it may be seen that the center of the beam follows a cylindrical surface, the surface passing through the center of the beam defining aperture 55 and the center of the beam separation aperture 59, which centers are diametrically opposed to one another on said cylindrical surface.

The forward beam direction near the nodal plane near the target 15 is dissimilar to that at the other nodal planes. In Figure 2*b*, it may be seen that the beam in approaching the target 15 is given somewhat greater curvature which prevents landing of the beam on the target 15. This change in path near the target is brought about by the joint action of the decelerating grid 61 and the target 15. The decelerating grid 61 is operated at substantially the accelerating electrode potential and is placed parallel to and close to the target 15. However, it is preferably in a region which is out of focus with respect to the electron beam, and is formed of sufficiently fine mesh so that no image thereof is formed upon the target and no substantial change in direction of the beam occurs at the mesh openings. The target 15 is given a voltage slightly positive with respect to the cathode. This voltage is adjusted to just prevent electrons from landing on the target. Assuming a beam energy of 200 volts directed at the indicated angle to the axis of the tube, as obtained by applying such a potential to the elements 54, 57, 58 and 61, the target potential should be adjusted to a few volts positive. The field established between the grid 61 and the target 15 rapidly decelerates the electrons in the beam, and causes the beam to curve rather rapidly in this region and enter the loop indicated at 49 in Figure 2*b* making a glancing, tangential approach to the target.

The loop 49 may be described as slightly twisting, approaching the shape of a parabola. The nodal plane of the beam at which the apex of parabola falls, is somewhat closer to the next adjacent nodal plane than the customary inter-nodal plane distance, the distance being lessened by half the distance between the decelerating electrode 61 and the target 15. Assuming for the moment that the axial magnetic field is uniform over the surface of the target, the return beam will then enter upon the return helical path indicated at 62 which is the mirror image of the forward beam. In effect it is specularly reflected. As shown in Figure 2*b*, the path of the return beam 62 has the same generally sinusoidal plan view of the forward beam 60. In Figure 2*b* it may be seen that the return path 62 of the beam is generally not coincident with the forward path 60 of the beam, but traces out a helix of opposite rotational progression upon a common cylindrical surface but of the same direction of rotation as viewed looking toward the cathode (Figure 2*c*). The forward and return beam paths 60 and 62 intersect both at the nodal (focal) planes and anti-nodal (anti-focal) planes when the point of maximum travel of the beam is adjusted to coincide with the nodal plane of the beam.

At this point, one might consider the laws governing the forward and return paths of the beam. The reasons for the adherence of the forward and the return beam to a common cylindrical surface is the well known law of motion of an electron in a constant magnetic field defining the radius of curvature:

$$R \alpha \frac{V}{H} \quad (1)$$

where

R is a radius of curvature of the electron trace, as projected into the plane of Figure 2*c*

V is the velocity of the electron in the same plane, and

H is the strength of the magnetic field, which is perpendicular to this plane

In the present application, the quantity V is a very small fraction of the speed imparted to the electron by the accelerating electrode at 200 volts. It is only that portion of the initial launching velocity which is in a plane perpendicular to the axis of the tube. Where the launching angle is inclined 9° to the field, the quantity V is equal to the initial beam velocity times the sine of 9°. It may now be observed that as the beam progresses from the limiting aperture 55 that no further change is made in the lateral energy of the electron beam, even in the region of the target neglecting for the moment any effects from the deflection coils. Specifically, in the region of the target, the electric field is along the axis of the tube and has no influence upon V which is directed perpendicularly thereto.

The second parameter H must also remain constant if the radius of curvature is to remain constant. It may be noted that the electron beam is provided with two pairs 20 of deflecting coils. These coils are designed to introduce an additional field which makes the originally straight flux lines to curve first away from the axial direction to a substantially straight but inclined direction and then to curve back into the axial direction. This type of deflection leaves the direction of the flux lines substantially unchanged at the aperture as well as at the target. At the area where the flux lines curve, that is the two portions where the bends occur, new lateral velocity components will be introduced into the beam. These new velocity components will cancel out if the deflection field is applied such that its extent along the tube axis is substantially an integral multiple e.g. 3 of the distance between the two adjacent nodes. By this adjustment, the beam has the same amount and direction of lateral velocity in the region of the target and limiting aperture as if it had not been deflected in the first place.

Assuming as above, that the magnetic field is uniform over the surface of the target, the return beam will pass through the apertured plate 58 at the separation aperture 59, which is at an anti-nodal plane and pass back into the cylinder 57. If one assumes, however, that the return beam is twisted out of its customary return path, as by the presence of a local change in the axial magnetic field at the surface of the target 15, the return beam will not pass through the aperture 59, but will instead impinge upon the surface of the member 58, and be amplified in the electron multiplier surrounding the cathode assembly.

The collection and multiplication of the return electrons not passing into the aperture 59 is made by means of the electron multiplier shown generally at 14 and comprising elements 58 and 63 through 69. The apertured member 58 forms the first dynode of the electron multiplier and is suitably coated with an electron emissive material so that return electrons striking the surface thereof will generate additional secondary electrons. These secondary electrons are directed into the additional stages of the electron multiplier by means of the "persuader" 63. The persuader 63, for reasons which will be developed below, is attached to the outer walls of the camera tube by means providing high heat transfer to the walls of the camera tube. The persuader 63 is electrically energized to deflect electrons down to the succeeding dynodes 64 through 68, respectively, and finally to the anode 69. The amplified return electron beam collected at the anode 69 is then led through the cable 23 shown in Figure 1 to the video amplifier 25. The electron multiplier except for the apertured first dynode is of conventional design and the direct potentials used to energize the various electrodes in the multiplier are selected in conventional fashion.

Since the foregoing camera tube is designed to provide extremely sensitive infra-red detection, it is desirable that the target be shielded from heat generated in the vicinity of the electron gun. Shielding of the target from the cathode assembly is achieved by the cylindrical member 57, as mentioned above. Shielding of the electron multiplier, in which there is normally not much heat generated, is accomplished by means of the persuader 63 which is connected in good heat exchanging relationship with respect to the outside walls of the camera tube. Direct screening of the heat passing through the slanted beam defining apertures 55 and 59 is provided by means of the spoon 45 shown affixed in good heat exchanging relationship to the walls of the camera tube. The spoon 45 preferably lies at or to the gun side of the nodal plane nearest to the electron gun. The spoon 45 extends in toward the center of the tube to a distance sufficient to subtend the 2° aperture defined by the apertures 55 and 59, thus preventing any direct heat radiation from the cathode to the target 15. The final measure used to reduce target sensitivity to cathode heating is the use of an infra-red reflective conductive coating on the surface of target 15 facing the cathode.

The construction, energization, and functioning of one form of applicant's infra-red sensing target may now be considered. A small portion of target 15 and window 16 is shown in detail in Figure 3. The target 15 is a thin wafer of glass, honeycombed with a large number of regularly spaced openings of generally cylindrical configuration. The glass may be of the type which is subject to selective etching after exposure to light. The openings are usually not precisely cylindrical, since in the etching process the outer portions of the cylinder are usually unavoidably etched to a somewhat greater diameter than the central portions. The holes of adjoining rows are preferably oriented on an angle of 60° to the row direction to permit a maximum number of openings and to create essentially equal wall thicknesses between any one opening and the six surrounding adjacent openings. According to present day techniques approximately 300 elements can be formed by the above method per lineal inch in a plate of a thickness of .003 inch. Placed in each of the openings is a small plug 71 of metallic material capable of becoming superconducting at a temperature in the region of absolute zero. Several materials are excellent for this application, the material lead being one. The intervening glass walls separating the metallic plugs are of glass and are of sufficient thickness to inhibit ready heat transfer from one metallic plug to an adjoining one because of their extremely low heat conductivity at these low temperatures. Disordered dielectrics like glass may have a heat conductivity more than 1000 times smaller than ordered crystalline matter like the one used for the plugs. The minimum wall thickness is typically of one fifth of the plug diameter. The surface of the target 15 facing the electron gun consists of a shiny reflective conductive material 73, selected to be non-superconductive at the operating temperatures. The surface 73 is also dimensioned to provide efficient reflection of infra-red energy. Since the current conduction requirements of the surface 73 are small for retaining the surface at a uniform electric potential, the conductive layer 73 may be quite thin, this tending to reduce the transfer of heat laterally from one plug to an adjoining plug. A suitable material is aluminum. The under surface of the target 15 is provided with a coating 74 of material which is highly absorbent to infra-red radiation and in good thermal contact with the plugs 71. A suitable material is carbon black. The radiation absorbing layer 74 is also selected to be sufficiently thin to inhibit the lateral transfer of heat energy along the surface of the target.

The path of radiation to the target 15 may best be seen in Figure 1. The radiation directed to the camera tube 10 is caused to pass through the infra-red transparent window 29 of the flask 11, the window 16 of the camera tube, thence through the space intervening between the end wall 16 and the target 15, and is finally absorbed in the infra-red absorbing layer 74 of the target.

Applicant's target responds to the existence of heat radiation in the following manner. The sensitive elements are the metallic plugs 71 disposed over the surface of the target 15. The space intervening between the window 16 and the lower surface of the target 15 contains helium gas at a reduced pressure to allow cooling of the target 15 to a temperature at which the metallic plugs 71 tend to be superconductive. The adjustment of the temperature in the liquid helium surrounding the camera tube 10 is such that the plugs 71 are held very close to the transition point between superconduction and normal conduction. When infra-red radiation is incident upon the heat absorbing layer 74 of the target, the heat absorbed in the layer 74 is conducted to the plugs 71, bringing about an elevation in temperature and/or a change from the superconducting to the nonconducting phase of specified plugs 71 or portions thereof. If a source of infra-red radiation is focused upon the infra-red sensitive target layer 74, the plugs 71 will tend to reach a stationary thermal condition, in which the heating effect of the infra-red radiation and the cooling effect of the helium gas are in equilibrium and in which certain of the plugs are in a state of complete or partial normal conduction. By partial normal conduction one means that part of the plug's core volume is still in superconductive state. The plugs 71 form a two dimensional record of the infra-red image focused on the target. Since the plugs 71 are capable of partial superconduction, there is some gray-scale.

This two dimensional record of the infra-red image on the target is read by the scanning electron beam in the ultimate process of converting the infra-red image to a visual image. The presence of superconduction in the plugs 71 brings about a deflection of the electron beam, causing a portion of the return beam to miss the separation aperture 59, and to enter the electron multiplier 14 instead.

Figures 3, 4A, 4B, 5, 6:
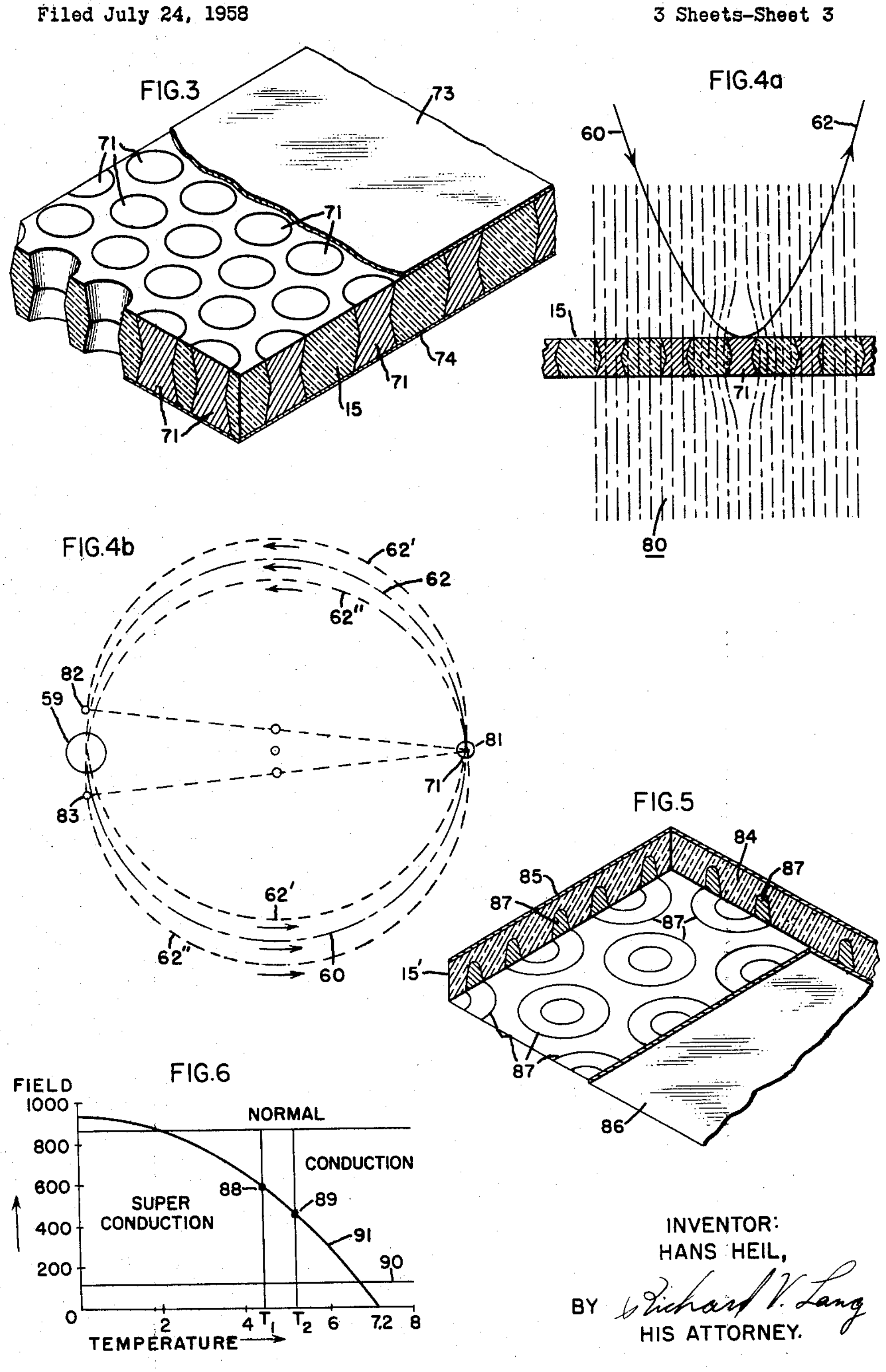
Figure 5 illustrates a modified construction of the target.
Figure 6 illustrates the mode of magnetic field adjustment required for operation of a camera tube employing a target of the type illustrated in Figure 5.

Referring now to Figure 4*a* there is shown a portion of the forward electron trajectory 60 proceeding toward the target 15 in a parabolical fashion, and returning from the vicinity of the target after tracing a loop tagential to the surface of the target. The portion of the beam under examination and constrained to follow the parabolical track is that lying between the target 15 and the decelerating grid 61, a space typically on the order of ¼ inch in depth. The beam is shown to approach a plug 71, now assumed to be superconducting. The magnetic flux lines 80 from the focusing and alignment coils extend beyond the decelerating grid 61 and pass through the target 15. While these flux lines are shown to be generally uniform in the indicated region, it may be specifically observed that in the region of the noted superconducting plug 71, the magnetic field is non-uniform. In particular, it may be seen that the flux lines have been excluded from the plug 71, creating a very low magnetic field in the region just above the superconducting plug. At the margins of the plug, the field is somewhat intensified. Under the influence of these magnetic field conditions, the beam no longer traces a path along the surface of the previously indicated cylinder. Instead, the curvature of the beam as projected into the target plane as now illustrated in Figure 4*b* encounters a net change in the vicinity of the target, causing the beam, after leaving the vicinity of the target, to trace out a path on a different cylindrical surface. The new cylindrical surface is, however, of equal diameter to the old. Figure 4*b* drawn looking along the axis of the tube 10 toward the cathode, illustrates this effect. The separation aperture is shown at 59 diametrically opposed to the point of nearest approach on the target shown at 81 and occupied by the superconducting plug 71 under discussion. Assuming for the moment that the element 71 is not superconducting, a particular electron in the forward beam 61 will experience no change in curvature in the region of the target. It will return along the path 62, finally passing through the separation aperture 59 and being absorbed in the gun assembly. In the event, however, that the element 71 is superconducting, the curvature in the region of the target is changed, being either reduced or enlarged, and the return beam now enters a path indicated at 62′ or 62″ along a new cylindrical surface. For the purpose of illustration the deflections at 81 are exaggerated. The direction of the deflection is dependent upon the precise orientation of the electron with respect to the superconducting plug. An electron whose trajectory is momentarily decreased in curvature as shown in the path 62′ strikes the first dynode at the point 82. An electron whose trajectory is momentarily increased in curvature as shown at 62″ is shown striking the first dynode 58 at the point 83. The aggregate effect of the changes of curvature of the electron trajectories arising in the region of the target from the indicated magnetic field discontinuity is a disturbance of the non-specular reflection in the region of target and a partial dispersion of the return beam into the surface of the first dynode. One may characterize the outlined dispersion as causing the beam to widen in a direction generally parallel to a line drawn between the points 82 and 83. Those electrons which are sufficiently diverted to miss the separation aperture 59, and thus strike the first dynode 58, enter the electron multiplier giving rise to a signal indicating an image on the target 15.

A second embodiment of the invention may be understood by joint consideration of Figures 1, 5 and 6. The principal difference in execution of the second embodiment lies in the construction of the target which is specifically illustrated in Figure 5. The principal difference in operation of the second embodiment is in provisions for controlling the magnetic field in the region of the target. The effect of adjusting the magnetic field upon the state of conduction of the elements of the target 15′ is illustrated in Figure 6. The second embodiment while having inherently a somewhat poorer resolution than achievable in the first embodiment is characterized by stronger magnetization effects and an improved gray scale. These matters will be further discussed below.

The target 15′, which is used in the second embodiment, is shown in Figure 5 in a broken away perspective view. As before, the target is formed of a thin sheet (84) of glass of a type of glass susceptible of selective etching after exposure to light. The glass is provided on its upper surface with a thin electrically conducting reflecting layer 85 similar to that used in the embodiment of Figure 3. On its lower surface it has a heat absorbing layer 86 of similar content and construction to the heat absorbing layer shown in Fig. 3. The sensitive elements of the target shown in Figure 5 are a plurality of ringlets 87 shown inserted in the underside of the wafer 84. The ringlets 87 may be of lead or other superconducting material. The dimensions of the ringlets may be in the scale generally illustrated in the drawing. The photographic etching process provides one satisfactory method of achieving a large number of elements over the surface of the target. Present techniques permit as high as 300 ringlets to a linear inch. The etching is preferably carried on as deeply as possible into the glass so as to bring the inner surfaces of the ringlets 87 close to the upper surface of the target. Etching should not, however, continue completely through the glass, since it is desired to retain the central glass cores in place. After etching, the lead is placed in the toroidal recesses and leveled with the glass, after which the heat absorbing layer 86 is applied. By this construction, the lower surfaces of the ringlets extend to and are in good thermal contact with the heat absorbing layer 86.

Operation of applicant's second embodiment requires resort to somewhat different magnetic field conditions than used in the first embodiment. These conditions need only exist prior to the operation of detecting an image upon the target and so do not affect the focusing or beam alignment during image detection. The provisions for bringing about these conditions have not been specifically illustrated since their execution may be conventional. In general, these provisions include means for periodically and controllably varying the magnetic field in the region of the target in the time interval between the scanning of successive frames of the target. The maximum field capabilities of these means should be greater than those normally used in focusing and aligning the electron beam but generally need not exceed 900 Gauss as when lead is used in the target. In general lower maximum field strengths are quite practical, the maximum value being dictated by the normal range of temperatures on the target and the desired gamma or contrast.

The purpose of field control and the mode of achieving a magnetic image of a heat radiator may be explained by resort to Figure 6. Figure 6 is a graph illustrating the effect of temperature and magnetic field upon the condition of super- or normal-conduction of the sensitive material of the target. The horizontal coordinate of the graph is temperature measured in degrees Kelvin and the vertical coordinate of the graph is magnetic field strength measured in Gauss. The line 91 represents the boundary between the normal conducting state and the superconducting state, the superconduction condition lying between the line 91 and the indicated coordinate axes. On examining the graph, it may be seen that a material will more readily become superconductive, as the temperature and the magnetic field are reduced. Assuming any particular operating temperature below the critical temperature (7.2° Kelvin for lead), the material may be rendered superconductive by a reduction in magnetic field or normally conductive by an increase in magnetic field.

This property is used in establishing a magnetic image with a gray scale on the target 15′. Let us now consider two ringlets (87) having given instantaneous temperatures $T_1$ and $T_2$, respectively. It may be noted that the ringlets will independently reach momentary operating temperatures as a result of the normal balance between the heating effect of incident radiation from an image focused upon the screen and the cooling effect of the gaseous helium in contact with the lower face of the target. Let us assume that one element has a somewhat lower temperature ($T_1$) than the other element, which has a temperature ($T_2$).

In order to sense the indicated temperature differential on the target the magnetic field conditions surrounding the target must be adjusted in the following manner. The elements of the target, though having different temperatures, are all initially in the superconducting state. This assumes that the magnetic field is at an initial minimum such as 60 to 100 Gauss suitable for normal focusing and for retaining all the elements superconducting. The magnetic field is then momentarily raised to a maximum value such that all elements of the target are made normally conducting and then the field is decreased to the initial value. As the field is changed, currents are induced in each of the ringlets. During reduction of the field the ringlet operating at the temperature $T_1$ becomes superconductive again at the field strength corresponding to the point 88. A further reduction in magnetic field to the level indicated at 90 generates super currents in the ringlet proportional to the difference in field between the field at 88 and the final field 90. These currents, due to the known properties of a superconducting material, will continue even after the magnetic field is no longer changing. At the same time, the ringlet whose initial temperature was $T_2$ will likewise experience a change to normal conduction followed by a return to the superconduction state. The return to superconduction of this element occurs at the field strength corresponding to the point indicated at 89 on Figure 6. Accordingly, when the field is reduced to the final value indicated by the line 90, a magnetic flux will effectively be frozen into this ringlet, corresponding to the difference in field strength between the field at the point 89 and the final field at the point 90. It may thus be seen that the super currents which circulate in the ringlets are of a magnitude proportioned to the momentary operating temperatures of the respective elements thus creation minute magnetic fields whose magnitudes are proportional to the operating temperatures of the respective elements.

In the foregoing field change operation, it is of course essential that the rate of reduction of the field be slow enough to permit the circulating currents occurring in the normal conduction state to dissipate before entry of the element into the superconducting state. This requirement provides no serious limitation upon the speed of operation of the system, at ordinary scanning rates since the time constants in the ringlets, when normally conducting, are quite small.

When the magnetic fields are thus "frozen into" the target, the reading electron beam is energized and caused to scan the target. If ultimate optical presentation is contemplated for visual reading, the conventional scanning rates and frame rates may be employed. The reading process is as indicated in the first embodiment. The presence of non-uniformity in the magnetic field on the upper surface of the target causes a non-specular reflection of the beam in the vicinity of the target and causes the return beam to land outside the separation aperture, and thus caused to enter the electron multiplier, giving rise to the visual signal current.

An effect which tends to enhance the contrast or the gray scale of the above second embodiment is the self-heating effect in the ringlets occasioned by the required flux changes. Since the ringlets are driven into a normally conducting state in the region above the curve 91, all changes in flux while the ringlets are normally conducting bring about a heating effect upon the ringlets. The amount of heating is smaller for the cooler elements and greater for the warmer elements. Hence, there is some enhancement in the actual temperature differences on the target, giving rise to some further enhancement in the magnetic field differences between elements of different temperatures. While it is generally contemplated that the flux changes will occur after each frame, they may also be made to take place after each line, if it is desired to take particular advantage of the foregoing heating effect.

Targets employed to "freeze in" magnetic fluxes, as employed in the second embodiment may of course take other forms than the indicated toroids. In general, it is of primary interest that closed current loops be available, which circle a non-superconductive core, and that there be low heat leakage between individual elements. Since the superconduction of electricity is not accompanied by high heat conductivity, the target may take the form of a thin continuous sheet of superconducting material, containing a plurality of small holes. The thickness of the sheet is selected sufficiently thin to make the lateral heat conduction between the elements small with respect to the rate of heat exchange involved in the absorbed radiation and in the helium gas cooling of the target. Such a target would require a non-superconductive backing member for support and to make the target impermeable to gas.

It may be further observed that the mode of target reading indicated, while preferred, is not the only kind which may be employed. One may also launch the beam with carefully proportioned axial energy, proportioned so that landing or non-landing on the target is controlled by the magnetic field conditions on the target. The signal intensity may then be read by measuring the target current, or by measuring the return current as is conventional in the image orthicon tubes. In this mode of operation the separation aperture is unnecessary, and the limiting aperture plate may be used as the first dynode of the electron multiplier. Angular beam launching is still preferred, since it will tend to enhance the tangential velocity of the beam at the target, which coupled with any transverse image magnetic field components in the plane of the target, will create an axial force to the individual electrons, and thus determine whether landing will occur or not.

One may also note that it may be desired in certain applications to be able to control the duration of image retention upon the target itself. Such an application would be one involving the viewing of moving targets. Control of the retentivity may be achieved by controlling the pressure of the helium gas in the chamber between the target 15 and the window 16 of the camera tube. The preferred upper limit of pressure variation is that indicated earlier, i.e. that the gas not be of sufficient density to create lateral spreading of the more intense images.

While specific embodiments of the invention have been shown and described, it should be understood that the invention is not limited thereto, and it is intended in the appended claims to claim all such variations as fall in the true spirit of the present invention.

What I claim as new and desire to secure by Letters Patent of the United States is:

1. In a thermally sensitive pickup tube, a thin target having a thermally sensitive material capable of localized regions of superconductivity, a heat radiation absorbing layer for reception of a thermal image on one surface of said target providing good heat transfer through said layer to said sensitive material, means for providing a substantially uniform magnetic field in the region of said target, means for cooling said sensitive material at a substantially uniform rate to a temperature below the superconducting temperature of said material, the reception of a thermal image on said one surface of said target causing said regions to assume non-uniform temperatures indicative of the thermal image for inducing corresponding non-uniformities in the magnetic field near said target, means for sensing magnetic field conditions at the other surface of said target comprising means for causing an electron beam to scan said other surface of said target, and current collecting means sensitive to changes in the beam trajectory occurring in the vicinity of said target.

2. The combination set forth in claim 1 wherein the thermally sensitive material of said target comprises a plurality of discrete elements established in a matrix having essentially low heat conducting properties.

3. The combination set forth in claim 1 wherein said cooling means comprises a chamber bounded on one side by said one surface of said target and on the opposing side by a parallelly arranged heat transparent window, said chamber being filled with helium gas at a reduced pressure, said helium gas in turn being cooled by immersion of said heat transparent window in liquid helium.

4. The combination set forth in claim 1 wherein said cooling means comprises a chamber bounded on one side by said one surface of said target and on the opposing side by a parallelly arranged heat transparent window, said chamber being filled with helium gas at a reduced pressure, the distance between said target and said window and the means free path of the gas molecules being comparable, said helium gas being cooled by immersion of said window in liquid helium.

5. In the combination set forth in claim 1, conducting means for creating an essentially equipotential surface on said other surface of said target.

6. In the combination set forth in claim 1, thin conducting means applied to said other surface of said target for creating an essentially equipotential surface while permitting relatively little lateral heat transfer over said surface.

7. In a thermally sensitive pickup tube, a thin target having a thermally sensitive material providing a plurality of current loops, individually capable of assuming superconductivity but surrounding a core of non-superconductive material, a radiation absorbing layer for reception of a thermal image on one surface of said target providing good heat transfer through said layer to said sensitive material, means for providing a substantially uniform magnetic field in the region of said target, means for cooling said sensitive material at a substantial uniform rate to a temperature below the superconducting temperature of said material, the reception of a thermal image on said one surface of said target causing said regions to assume non-uniform temperatures indicative of the thermal image for inducing corresponding non-uniformities in the magnetic field near said target, means for increasing said magnetic field to a point where substantially all of said target is made normally conducting and then decreasing said magnetic field to a point where substantially all of said target is made superconducting whereby the supercurrents established in said loops have magnitudes and resulting magnetic fields dependent on their respective temperatures, means for sensing magnetic field conditions at the other surface of said target comprising means for causing an electron beam to scan said other surface of said target, and current collecting means sensitive to changes in the beam trajectory occurring in the vicinity of said target.

8. The combination set forth in claim 7 wherein the thermally sensitive material of said target comprises a plurality of disecrete ringlets established in a matrix having low heat conducting properties.

9. The combination set forth in claim 7 wherein said cooling means comprises a chamber bounded on one side by said one surface of said target and on the opposing side by a parallelly arranged heat transparent window, said chamber being filled with helium gas at a reduced pressure, said helium gas in turn being cooled by immersion of said heat transparent window in liquid helium.

10. The combination set forth in claim 7 wherein said cooling means comprises a chamber bounded on one side by said one surface of said target and on the opposing side by a parallelly arranged heat transparent window, said chamber being filled with helium gas at a reduced pressure, the distance between said target and said window and the mean free path of the gas molecules being comparable, said helium gas being cooled by immersion of said window in liquid helium.

11. In the combination set forth in claim 7, conducting means for creating an essentially equipotential surface on said other surface of said target.

12. In the combination set forth in claim 7, conducting means applied to said other surface of said target for creating an essentially equipotential surface while permitting relatively little lateral heat transfer over said surface.

13. In a thermally sensitive pickup tube, a thin target having a thermally sensitive material capable of localized regions of superconductivity, a heat radiation absorbing layer for reception of a thermal image on one surface of said target providing good heat transfer through said layer to said sensitive material, conducting means for creating an essentially equipotential surface on said other surface of said target, means for providing a substantially uniform magnetic field perpendicular to said target, means for cooling said sensitive material at a substantially uniform rate to a temperature below the superconducting temperature of said material, the reception of a thermal image on said one surface of said target causing said regions to assume non-uniform temperatures indicative of the thermal image for inducing corresponding non-uniformities in the magnetic field near said target, means for sensing magnetic field conditions at the other surface of said target comprising means for causing an electron beam to approach said other surface of said target non-perpendicularly and to scan said other surface, and current collecting means sensitive to changes in the beam trajectory occurring in the vicinity of said target.

14. In a thermally sensitive pickup tube, a thin target having a thermally sensitive material capable of localized regions of superconductivity, a heat radiation absorbing layer for reception of a thermal image on one surface of said target providing good heat transfer through said layer to said sensitive material, conducting means for creating an essentially equipotential surface on said other surface of said target, means for providing a substantially uniform magnetic field perpendicular to said target, means for cooling said sensitive material at a substantially uniform rate to a temperature below the superconducting temperature of said material, the reception of a thermal image on said one surface of said target causing said regions to assume non-uniform temperatures indicative of the thermal image for inducing corresponding non-uniformities in the magnetic field near said target, means for sensing magnetic field conditions at the other surface of said target comprising means for forming and launching an electron beam at an angle to perpendicularity to said target for causing said beam to approach said other surface of said target non-perpendicularly, means for causing said electron beam to scan said other surface, and current collecting means sensitive to changes in the beam trajectory occurring in the vicinity of said target comprising an apertured member for separating those portions of the beam experiencing a non-specular reflection from those experiencing a specular reflection in the vicinity of said target.

15. The combination set forth in claim 14 wherein said apertured member is arranged between said beam launching means and said target, and is oriented to permit passage of said outgoing beam and those portions of said return beam which experience specular reflection in the vicinity of said target.

16. The combination set forth in claim 14 wherein the distance between said beam forming and launching means and said target is approximately equal to an integral multiple of the distance between the nodal planes of said beam in said magnetic field, and the distance between said beam forming and launching means and said separation aperture is one half said internodal plane distance.

17. The combination set forth in claim 14 wherein the distance between said beam forming and launching means and said target is approximately equal to an integral multiple of the distance between nodal planes of said beam in said magnetic field, the distance between said beam forming and launching means and said apertured member is one half said internodal plane distance, and said apertured member is coated with a secondary electron emissive layer for multiplying electrons in the return beam striking said member.

18. In the combination set forth in claim 14, means for controlling the approach of said electron beam to said target comprising a grid arranged in proximity to and parallel to said target.

19. In a thermally sensitive pickup tube, a thin target having a thermally sensitive material capable of localized regions of superconductivity, a heat radiation absorbing layer for reception of a thermal image on one surface of said target providing good heat transfer through said layer to said sensitive material, conducting means for creating an essentially equipotential surface on said other surface of said target, means for providing a substantially uniform beam focusing magnetic field oriented perpendicular to said target, means for cooling said sensitive material at a substantially uniform rate to a temperature below the superconducting temperature of said material, the reception of a thermal image on said one surface of said target causing said regions to assume non-uniform temperatures indicative of the thermal image for inducing corresponding non-uniformities in the magnetic field near said target, means for sensing magnetic field conditions at the other surface of said target comprising means for forming and launching an electron beam from a beam defining aperture at an angle to perpendicularity to said target for causing said beam to follow a helical path in said focusing field and to approach said other surface of said target non-perpendicularly, means for controlling the approach of said electron beam to said target comprising a grid arranged in proximity to and parallel to said target, means for causing said electron beam to scan said other target surface, current collecting means sensitive to changes in the beam trajectory occurring in the vicinity of said target comprising a separation aperture arranged between said beam launching means and said target, and oriented to permit passage of said outgoing beam and those portions of said return beam which experience a specular reflection in the vicinity of said target, and a heat radiation shield maintained at a low temperature oriented in line with said apertures but avoiding said helical path for blocking heat radiation from said beam forming and launching means upon said target.

20. The combination set forth in claim 19 wherein the distance between said beam defining aperture and said target is approximately equal to an integral multiple of the distance between nodal planes, the distance between said apertures is one half said internodal distance, and the distance between said separation aperture and said heat shield is approximately one half of said internodal distance.

21. In the combination set forth in claim 19, wherein said sensitive material is formed into a plurality of current loops individually capable of assuming superconductivity but surrounding a core of non-superconductive material, means for increasing said magnetic field to a point where substantially all of said target is made normally conducting and then decreasing said magnetic field to a point where substantially all of said target is made superconducting whereby the super currents established in said loops have magnitudes and resulting magnetic fields dependent on their respective temperatures.

22. In a thermally sensitive pickup tube, a thin target having a thermally sensitive material providing a plurality of current loops, individually capable of assuming superconductivity but surrounding a core of non-superconductive material, a heat radiation absorbing layer for reception of a thermal image on one surface of said target providing good heat transfer through said layer to said sensitive material, conducting means for creating an essentially equipotential surface on said other surface of said target, means for providing a substantially uniform magnetic field perpendicular to said target, means for cooling said sensitive material at a substantially uniform rate to a temperature below the superconducting temperature of said material, the reception of a thermal image on said one surface of said target causing said regions to assume non-uniform temperatures indicative of the thermal image for inducing corresponding non-uniformities in the magnetic field near said target, means for sensing magnetic field conditions at the other surface of said target comprising means for forming and launching an electron beam at an angle to perpendicularity to said target for causing said beam to approach said other surface of said target non-perpendicularly, means for increasing said magnetic field to a point where substantially all of said target is made normally conducting and then decreasing said magnetic field to a point where substantially all of said target is made superconducting whereby the super currents established in said loops have magnitudes and resulting magnetic fields dependent on their respective temperatures, means for causing said electron beam to scan said other surface, and current collecting means sensitive to changes in the beam trajectory occurring in the vicinity of said target comprising an apertured member for separating those portions of the beam experiencing a non-specular reflection from those experiencing a specular reflection in the vicinity of said target.

References Cited in the file of this patent

UNITED STATES PATENTS

| | | |
|---|---|---|
| 2,369,569 | Hulbert | Feb. 13, 1945 |
| 2,372,450 | Rajchman et al. | Mar. 27, 1945 |
| 2,522,153 | Andrews | Sept. 12, 1950 |
| 2,579,351 | Weimer | Dec. 18, 1951 |